US009191132B2

(12) United States Patent
Lee et al.

(10) Patent No.: US 9,191,132 B2
(45) Date of Patent: Nov. 17, 2015

(54) BROADCAST RETRANSMITTING METHOD, AND BROADCAST RETRANSMITTING APPARATUS, BROADCAST OUTPUT APPARATUS, AND BROADCAST RETRANSMITTING SYSTEM USING THE SAME

(75) Inventors: Young-jin Lee, Suwon-si (KR); Yong-deok Chang, Suwon-si (KR); Jung-pil Yu, Suwon-si (KR); Chan-sub Park, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 12/949,454

(22) Filed: Nov. 18, 2010

(65) Prior Publication Data

US 2011/0162019 A1 Jun. 30, 2011

(30) Foreign Application Priority Data

Dec. 28, 2009 (KR) ........................ 10-2009-0131748

(51) Int. Cl.

| | |
|---|---|
| ***H04N 7/18*** | (2006.01) |
| ***H04H 20/08*** | (2008.01) |
| ***H04H 20/63*** | (2008.01) |
| ***H04H 60/80*** | (2008.01) |

(52) U.S. Cl.

CPC ............... *H04H 20/08* (2013.01); *H04H 20/63* (2013.01); *H04H 60/80* (2013.01)

(58) Field of Classification Search

CPC .................. H04N 21/43615; H04N 21/41422; H04N 21/4126

See application file for complete search history.

(56) References Cited

U.S. PATENT DOCUMENTS

| | | | | |
|---|---|---|---|---|
| 5,940,738 | A * | 8/1999 | Rao | 725/103 |
| 8,254,322 | B2 | 8/2012 | Shan et al. | |
| 2002/0122140 | A1 * | 9/2002 | Cowley | 348/731 |
| 2003/0177503 | A1 * | 9/2003 | Sull et al. | 725/112 |
| 2006/0294573 | A1 * | 12/2006 | Rogers et al. | 725/147 |
| 2009/0106806 | A1 * | 4/2009 | Lee et al. | 725/110 |
| 2009/0125964 | A1 * | 5/2009 | Freundlich et al. | 725/118 |
| 2009/0207800 | A1 | 8/2009 | Shan et al. | |
| 2009/0282309 | A1 * | 11/2009 | Yue et al. | 714/748 |

FOREIGN PATENT DOCUMENTS

| | | | |
|---|---|---|---|
| CN | 1187918 | A | 7/1998 |
| CN | 201197146 | Y | 2/2009 |
| KR | 10-2001-0042231 | A | 5/2001 |
| KR | 10-2009-0089036 | A | 8/2009 |
| WO | 99/49602 | A1 | 9/1999 |

OTHER PUBLICATIONS

Communication dated May 5, 2014 issued by the State Intellectual Property Office of P.R. China in counterpart Chinese Patent Application No. 201010623409.0.

Communication dated Nov. 19, 2014, issued by The State Intellectual Property Office of P.R. China in related application No. 201010623409.0.

Communication dated Aug. 21, 2015, issued by the Korean Intellectual Property Office in counterpart Korean Application No. 10-2009-0131748.

* cited by examiner

*Primary Examiner* — Joshua Taylor

(74) *Attorney, Agent, or Firm* — Sughrue Mion, PLLC

(57) ABSTRACT

A broadcast retransmitting method, a broadcast retransmitting apparatus, a broadcast output apparatus, and a broadcast retransmitting system using the same are provided. The broadcast retransmitting method includes receiving a broadcast signal, detecting an available frequency band, retransmitting the received broadcast signal, and transmitting information regarding the broadcast signal.

23 Claims, 9 Drawing Sheets

BROADCAST RETRANSMITTING METHOD, AND BROADCAST RETRANSMITTING APPARATUS, BROADCAST OUTPUT APPARATUS, AND BROADCAST RETRANSMITTING SYSTEM USING THE SAME

CROSS-REFERENCE TO RELATED APPLICATION

This application claims priority from Korean Patent Application No. 10-2009-131748, filed on Dec. 28, 2009, in the Korean Intellectual Property Office, the disclosure of which is incorporated herein by reference in its entirety.

BACKGROUND

1. Field

Methods and apparatuses consistent with the exemplary embodiments relate to a broadcast retransmitting method, and a broadcast retransmitting apparatus, a broadcast display apparatus, and a broadcast retransmitting system using the same, and more particularly, to a broadcast retransmitting method which retransmits a broadcast received at a host apparatus to a surrounding apparatus, and a broadcast retransmitting apparatus, a broadcast display apparatus, and a broadcast retransmitting system using the same.

2. Description of the Related Art

The rapid development of information and communication technologies has contributed to the establishment of networks across countries, industries, and homes. In particular, users commonly own at least one mobile communication device and easily exchange data with one another using the mobile communication device in a wireless manner within their homes or offices.

Through the development of broadcast communication technology, users today can enjoy diverse broadcast content provided by diverse broadcast providers through a terrestrial broadcast, a satellite broadcast or a cable broadcast. In order to watch such a broadcast, users should generally use a device designed to receive a broadcast, such as a television or a digital multimedia broadcasting (DMB) receiver.

However, because of the widespread use of diverse communication devices, there is a necessity to find a method for allowing a communication device to receive a broadcast previously received at a broadcast receiving apparatus from a broadcast provider and to provide the broadcast to a user, although the communication device is not designed to directly receive a broadcast from the broadcast provider.

However, there is a problem that a channel environment is limited because an available frequency band is already saturated. In particular, the problem becomes more serious if a broadcast should be transmitted to a plurality of devices.

In order to solve such a problem relating to the lack of radio resources, a technique regarding cognitive radio (CR) has been discussed. The CR technique refers to a method that shares radio resources by finding unoccupied frequency channels through a temporal/spatial check on frequency channels already allocated to a primary user, and allowing a secondary user to use the unoccupied channel without interfering with the primary user.

Users may watch a broadcast using a plurality of TVs, or using several monitors or mobile devices within their homes. In this situation, a method for a host TV to wirelessly retransmit a broadcast to the other devices and allow them to easily receive the broadcast has been suggested. This method may be performed using wireless communication such as a wireless LAN. However, there is a need to establish a broadcasting system which supports stable transmission even when it uses a narrow bandwidth.

Since such a broadcasting system requires broadcast retransmission in a home, there is a problem that frequency bands are already saturated so that an extra frequency band is not allocated. If a CR technique is used to find an unauthorized idle frequency band, there is still a problem that an available frequency range is not always uniform and is limited. Therefore, there is a need for establishing a more efficient broadcast retransmitting system.

SUMMARY

One or more exemplary embodiments may overcome the above disadvantages and other disadvantages not described above. However, it is understood that an exemplary embodiment is not required to overcome the disadvantages described above, and an exemplary embodiment may not overcome any of the problems described above.

One or more exemplary embodiments provide a broadcast retransmitting method which retransmits a broadcast received at a host device to a surrounding apparatus, and a broadcast retransmitting apparatus, a broadcast display apparatus, and a broadcast retransmitting system using the same.

According to an aspect of an exemplary embodiment, there is provided a broadcast retransmitting method, including: receiving a broadcast, detecting an available band through spectrum sensing on idle bands, retransmitting the received broadcast to a surrounding apparatus using the detected available band, and transmitting information regarding the broadcast to the surrounding apparatus through a channel of a band which is different from the available band.

The detecting operation may be performed at predetermined time intervals or time intervals predefined by a user, and the transmitting operation may transmit the information regarding the broadcast if the available band is changed.

The surrounding apparatus may selectively display a broadcast which is provided through some channel among the broadcasts received using the available band, and, if a command to change a channel of a broadcast displayed on the surrounding apparatus is input, may change the channel based on the information regarding the broadcast.

If a command to change a channel of a broadcast displayed on the surrounding apparatus is input, the surrounding apparatus may change the channel based on the information regarding the broadcast without performing spectrum sensing.

The band different from the available band may be an industrial, scientific and medical (ISM) band.

The ISM band may be a band for using ZigBee communication or Bluetooth communication.

The information regarding the broadcast may include information regarding the available band and information regarding a current status of a band for each broadcast channel included in the available band.

The transmitting operation may transmit the information regarding the broadcast to the surrounding apparatus, if a request for the information regarding the broadcast is received from the surrounding apparatus through the channel of the different band.

The broadcast retransmitting method may further include exchanging data except for the broadcast and the information regarding the broadcast though the channel of the different band.

The data may include data regarding reception intensity when the surrounding apparatus receives the broadcast, and data regarding a rank of the channel.

According to an aspect of another exemplary embodiment, there is provided a broadcast retransmitting apparatus, including: a spectrum sensing unit which detects an available band from idle bands to retransmit a received broadcast, and a control unit which controls the received broadcast to be retransmitted to a surrounding apparatus using the detected available band, and information regarding the broadcast to be transmitted to the surrounding apparatus through a channel of a band which is different from the available band.

The spectrum sensing unit may perform spectrum sensing at predetermined time intervals or time intervals predefined by a user, and the control unit may control the information regarding the broadcast to the surrounding apparatus if the available band is changed.

The broadcast retransmitting apparatus may further include a broadcast information generation unit which generates information regarding the available band detected by the spectrum sensing unit, and information regarding a current status of a band for each broadcast channel included in the available band.

The broadcast retransmitting apparatus may further include a communication interface which retransmits the broadcast and exchanges the information regarding the broadcast. The control unit may control the information regarding the broadcast to be transmitted to the surrounding apparatus through the band different from the available band, if a request for the information regarding the broadcast is received from the surrounding apparatus through the communication interface.

According to an aspect of still another exemplary embodiment, there is provided a broadcast display apparatus, including a communication interface which receives a broadcast using an available band detected by a host apparatus and receives information regarding the broadcast through a channel of a band which is different from the available band, and a control unit which changes a channel for receiving the broadcast based on the information regarding the broadcast and displays a broadcast received through the changed channel.

According to an aspect of yet another exemplary embodiment, there is provided a broadcast retransmitting system including: a first device which receives a broadcast, retransmits the broadcast using an available band detected by spectrum sensing on idle bands to a surrounding apparatus, and transmits information regarding the broadcast to the surrounding apparatus through a channel of a band which is different from the available band, and a second device which selectively receives some of broadcasts transmitted using the available band, based on the information regarding the broadcast which is received through the channel of the band which is different from the available band.

The first device may have a function of receiving a broadcast from a broadcasting station or a satellite, and the second device may not have a function of receiving a broadcast from the broadcasting station or the satellite.

Accordingly, the information regarding the frequency band for retransmitting the broadcast can be provided without additional spectrum sensing and interference, and a time required to change the channel can be reduced.

Additional aspects of the exemplary embodiments will be set forth in the detailed description.

BRIEF DESCRIPTION OF THE DRAWING FIGURES

The above and/or other aspects will be more apparent by describing in detail exemplary embodiments, with reference to the accompanying drawings in which.

DETAILED DESCRIPTION OF THE EXEMPLARY EMBODIMENTS

Figure 1:
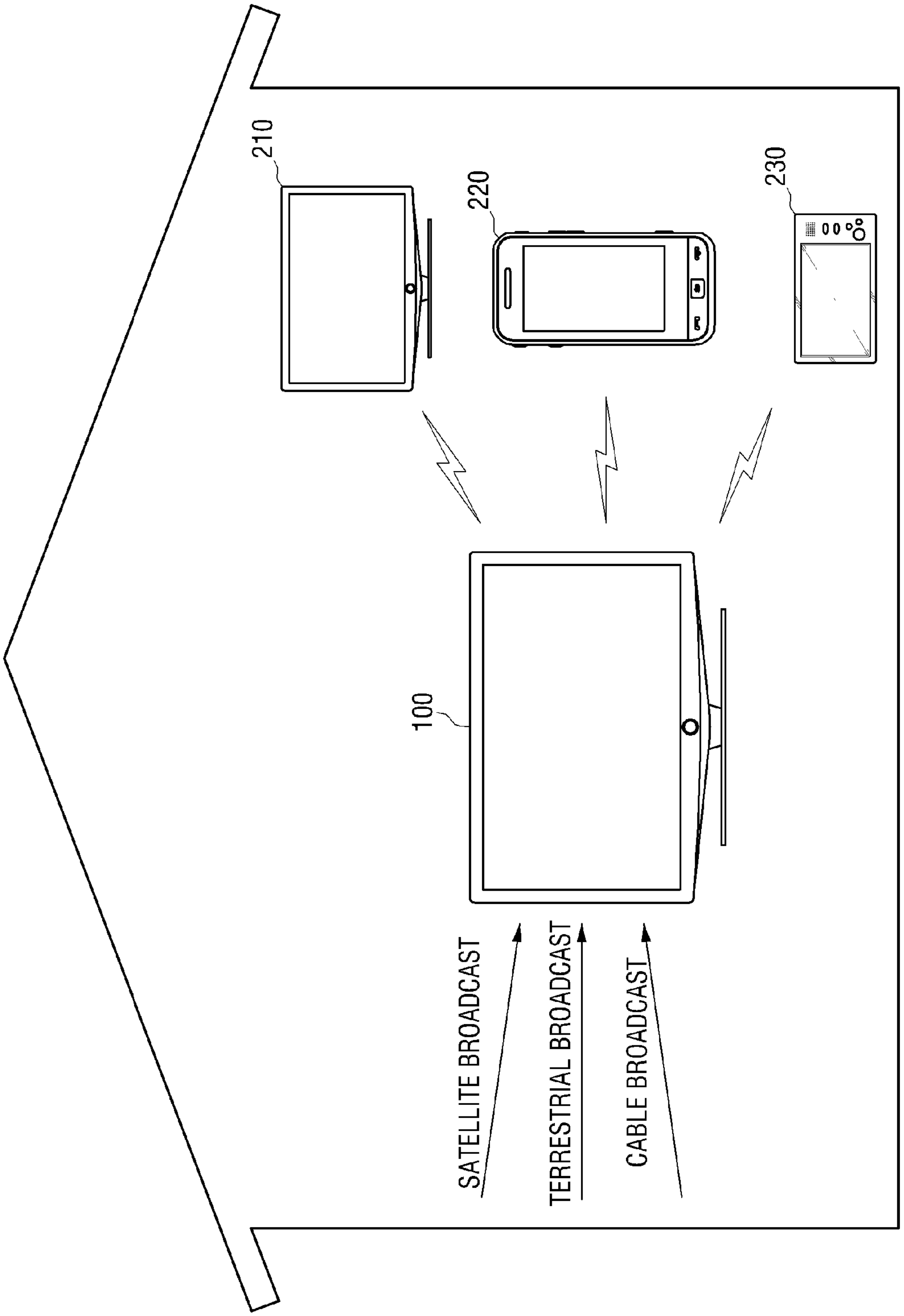
FIG. 1 is a view illustrating a home broadcasting system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
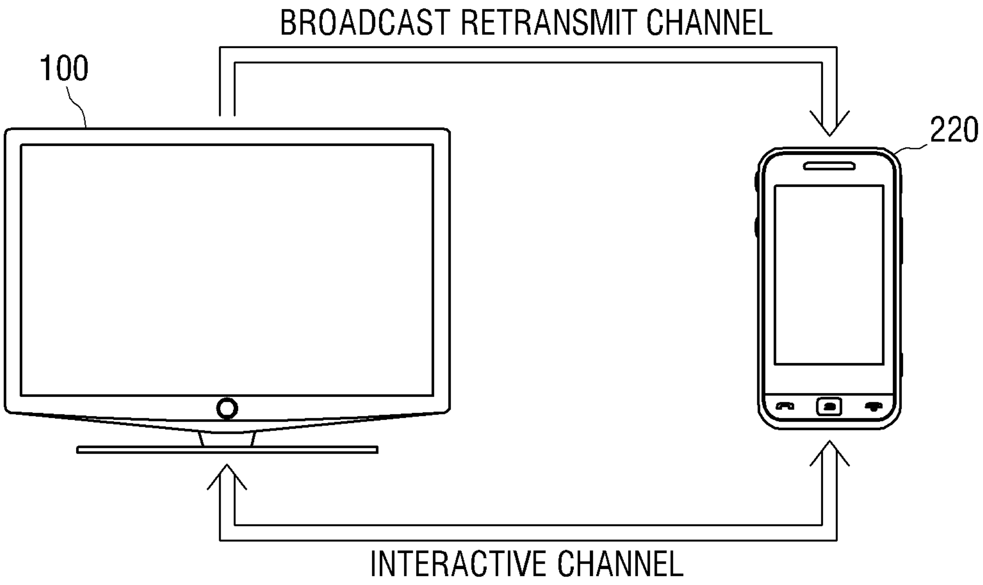
FIG. 2 is a view to explain a broadcast retransmit channel and an interactive channel which are discriminated from each other.
Figure 3:
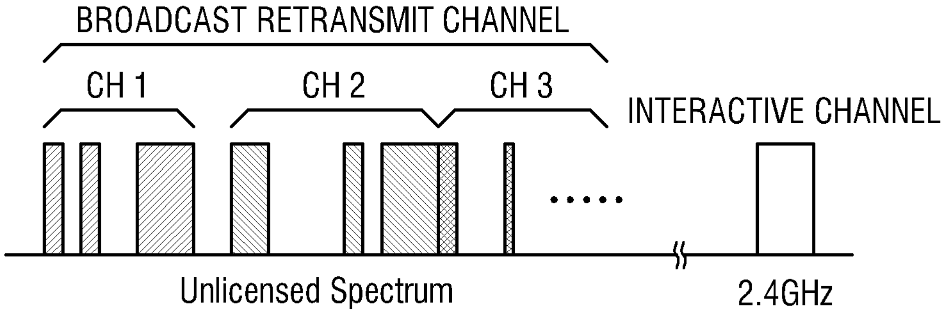
FIG. 3 is a view illustrating channels according to frequency bands.
Figure 4:
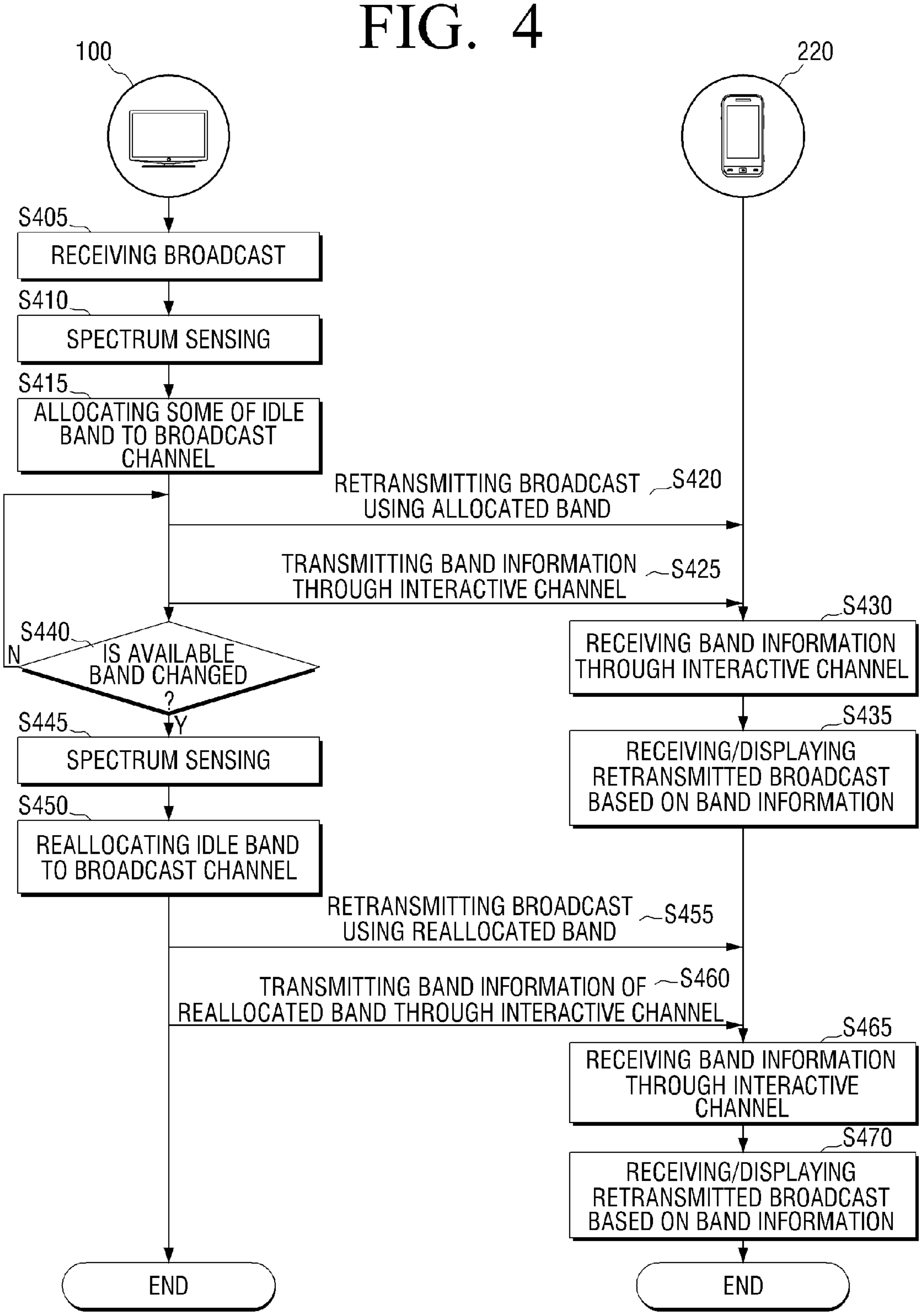
FIG. 4 is a flowchart illustrating a broadcast retransmitting method if an available band is changed.

With reference to FIGS. 1 to 3, an environment for retransmitting a broadcast and a channel for retransmitting a broadcast will be described. With reference to FIGS. 4 to 6, a process of retransmitting a broadcast will be described, and, with reference to FIGS. 7 and 8, a broadcast retransmitting apparatus and a receiving apparatus will be described.

<Environment and Channel for Retransmitting Broadcast>

Hereinafter, an environment and a channel for retransmitting a broadcast will be described with reference to FIGS. 1 to 3.

FIG. 1 is a view illustrating a home broadcasting system according to an exemplary embodiment. The term "home broadcasting" recited herein refers to a broadcast retransmitting method, in which a broadcast signal once transmitted to a broadcast receiving apparatus in a home is retransmitted to another device so that a user can watch the broadcast using another device. Therefore, the home broadcasting system according to an exemplary embodiment is a kind of broadcast retransmitting system.

The term "retransmitting" means that a broadcast signal which has been transmitted to a device from a broadcasting station or a satellite is retransmitted to another device.

The home broadcasting system includes a host apparatus to receive and retransmit a broadcast signal and a surrounding apparatus to receive the broadcast signal previously received by the host apparatus. In this embodiment, a host TV 100 is illustrated as a host apparatus, and a TV 210, a mobile phone 220, and a portable multimedia player (PMP) 230 are illustrated as a surrounding apparatus.

The host TV 100 performs its original operation of receiving a broadcast signal from a broadcasting station or a satellite and displaying it for a user, as described above. The host TV 100 may receive a satellite broadcast signal, a terrestrial broadcast signal, or a cable broadcast signal.

The host TV 100 retransmits the received broadcast signal to one or more surrounding apparatuses. In particular, the host TV 100 detects an available band from unauthorized bands through spectrum sensing on an idle band and retransmits the received broadcast signal using the available band. Channels included in the available band, which is used to retransmit the broadcast signal, are referred to as "broadcast retransmit channels."

The host TV 100 exchanges data such as information regarding a broadcast (hereinafter, referred to as "broadcast information") with the surrounding apparatuses. The broadcast information includes information regarding an available band used to transmit a broadcast signal, information regarding a current status of a retransmitting frequency band of each channel (hereinafter, referred to as "band information"), and also includes diverse information for the surrounding apparatuses to re-receive a broadcast signal and allow a user to watch the broadcast.

The broadcast information may be exchanged through an industrial, scientific and medical (ISM) band. A channel through which the broadcast information is exchanged is referred to as an "interactive channel."

As described above, the surrounding apparatus re-receives the broadcast from the host TV 100 and provides the broadcast signal to a user who uses the surrounding apparatus.

The TV 210 provides the broadcast signal retransmitted from the host TV 100 to a user, in addition to receiving a broadcast signal from a broadcasting station or a satellite and providing the received broadcast signal to a user. Accordingly, the users of the TV 210 can watch a broadcast received at the TV 210 from a broadcasting station or a satellite, and, if it is difficult or inconvenient to do so, for example, if an antenna is not connected, the users can watch a broadcast retransmitted from the host TV 210.

The mobile phone 220 also provides the broadcast signal retransmitted from the host TV 100 to a user in addition to communicating with subscribers of a mobile communication network. Also, the PMP 230 provides the broadcast signal retransmitted from the host TV 100 to a user in addition to playing multimedia. Accordingly, the user of the mobile phone 220 or the PMP 230 can watch a broadcast received from the host TV 100 in the home even if the mobile phone 220 or the PMP 230 does not have a function of receiving a broadcast signal from a broadcasting station or a satellite.

Hereinafter, the broadcast retransmit channel which is used to retransmit a broadcast and the interactive channel which is used to exchange broadcast information will be described with reference to FIGS. 2 and 3.

FIG. 2 is a view illustrating the broadcast retransmit channel and the interactive channel, and FIG. 3 is a view illustrating channels according to frequency bands. In FIG. 2, the mobile phone 220 is illustrated as an example of a surrounding apparatus.

The broadcast retransmit channel is used for the host TV 100 to retransmit a received broadcast signal to a surrounding apparatus. The broadcast retransmit channel is determined by detecting an available band from unauthorized bands through spectrum sensing on idle bands. If a broadcast signal is retransmitted through the broadcast retransmit channel, the surrounding apparatuses detect a band to receive the broadcast signal through spectrum sensing and receive the broadcast signal using the band, and provide a broadcast of a desired channel to the user among the received broadcasts through channel scanning.

Availability of the unlicensed band is variable. Therefore, if it is impossible to retransmit a broadcast signal using a detected available band, the TV 100 re-detects an idle band from unauthorized bands through spectrum sensing and transmits the broadcast signal through a changed channel.

However, if the broadcast signal is to be transmitted using the changed band, the surrounding apparatus performs spectrum sensing again to receive the broadcast signal. That is, whenever the availability of the unauthorized band is changed, a time delay problem is caused by the changes in the frequency band and the channel.

In order to prevent this problem, the broadcast information is exchanged through the interactive channel, which is different from the broadcast retransmit channel.

In particular, as shown in FIG. 3, the interactive channel may use an ISM band other than an available unauthorized band to retransmit a broadcast. The ISM band is a frequency band which can be used in the fields of industry, science and medical devices. In ITU-R, some frequency band is designated as an ISM band. The Zigbee used at 2.4 GHz makes it possible to transmit information at 250 KBPS through OQPSK modulation and CSMA-CA channel access, and Bluetooth used at 2.45 GHz makes it possible to transmit information at a maximum rate of 24 MBPS in the case of a 3.0 version.

The information which is exchanged through such an interactive channel may be information regarding a broadcast signal, information regarding the host TV 100, or information regarding the surrounding apparatuses.

For example, the broadcast information may include information regarding a band which is reallocated to each broadcast channel if an available band is changed. If the broadcast information is exchanged through the interactive channel rather than the broadcast retransmit channel, the surrounding apparatuses are not required to detect a band and a channel to receive a broadcast even when it is not possible for the host TV 100 to transmit a broadcast using a detected available band.

<Broadcast Retransmitting Process>

Hereinafter, a method for exchanging a broadcast signal and broadcast information using a broadcast retransmit channel and an interactive channel will be described with reference to FIGS. 4 to 6. In FIGS. 4 to 6, the mobile phone 220 is illustrated as a representative of surrounding apparatuses for convenience of explanation.

FIG. 4 is a flowchart illustrating a broadcast retransmitting method if an available band is changed.

The host TV 100 receives a satellite broadcast signal, a terrestrial broadcast signal, or a cable broadcast signal from a broadcasting station or a satellite (S405), and performs spectrum sensing with respect to unauthorized idle bands to retransmit the broadcast signal to the mobile phone 220 (S410).

If an idle band is detected from unauthorized bands through spectrum sensing, the host TV 100 allocates some of the idle band to respective broadcast channels (S415) and retransmits the broadcast signal to the mobile phone 220 using the allocated band (S420).

Also, the host TV 100 transmits band information regarding the allocated band to the mobile phone 220 through an interactive channel (S425). At this time, the host TV 100 may transmit diverse information, which is necessary for the mobile phone 220 to receive the broadcast signal transmitted using the idle band and to allow the user to watch the broadcast, to the mobile phone 220 through the interactive channel.

The mobile phone 220 receives band information from the host TV 100 through the interactive channel (S430), and receives and displays the retransmitted broadcast signal based on the band information (S435). For example, if a user wishes to watch a broadcast provided by a broadcasting station "A", a channel "7" may be selected based on received band information. If the selected channel "7" is input, the mobile phone 220 receives a broadcast signal of a band to which the channel "7" is allocated and displays the broadcast.

The host TV 100 performs spectrum sensing again at predetermined time intervals or time intervals set by a user in order to monitor whether an available band is changed or not (S440). The host TV 100 determines whether the available band is still available, and if not, whether there is another channel to replace the available band.

If a current broadcast retransmitting band is not an available band as a result of spectrum sensing, that is, if an available band is changed (S440-Y), the host TV 100 detects again an idle band from unauthorized bands through spectrum sensing (S445).

If an idle band is detected from unauthorized bands through spectrum sensing, the host TV 100 reallocates the idle band to the respective broadcast channels (S450), and retransmits the broadcast signal to the mobile phone 220 through the reallocated band (S455).

The host TV 100 transmits band information regarding the reallocated band to the mobile phone 220 through the interactive channel (S460). At this time, diverse information which is necessary for the mobile phone 220 to receive the broadcast signal received using the idle band and to allow a user to watch the broadcast may be transmitted to the mobile phone 220 through the interactive channel.

The mobile phone 220 receives the band information from the host TV 100 through the interactive channel (S465), and receives and displays the retransmitted broadcast signal based on the band information (S470).

As described above, since the band information is transmitted through the extra interactive channel, not the broadcast retransmit channel, the mobile phone 220 can continuously provide the retransmitted broadcast signal to the user without interruption.

If the available band is changed partly rather than entirely, the frequency band of the channel being received by the mobile phone 220 may not be changed. In this case, the mobile phone 220 identifies that the frequency band of the channel of the broadcast signal, which is being currently watched, is not changed, based on the information regarding the reallocated band, and does not change the band for receiving the broadcast signal.

In the above exemplary embodiment, if an available band is changed, the host TV 100 transmits information regarding the changed band to the mobile phone 220. However, if there is a request for a channel which is not currently retransmitted, the mobile phone 220 may request the host TV 100 to transmit broadcast information. In particular, a broadcast retransmitting method in which more idle bands can be detected will be described with reference to FIG. 5A, and a broadcast retransmitting method in which idle bands cannot be detected anymore or if there is a unoccupied channel will be described with reference to FIG. 5B.

Figure 5A:
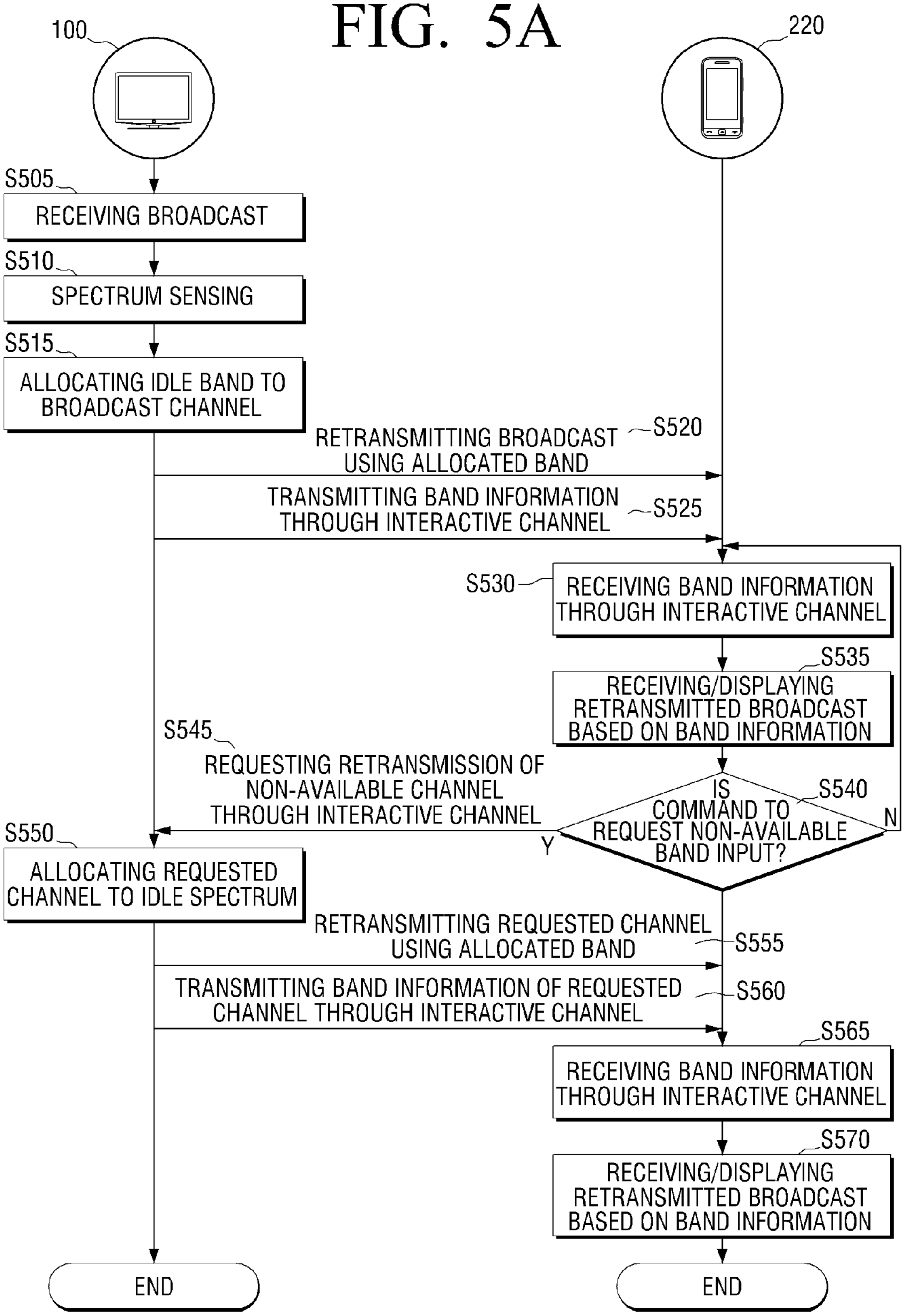
FIGS. 5A and 5B are flowcharts illustrating a broadcast retransmitting method if channel information is requested by a surrounding apparatus.
Figure 5B:
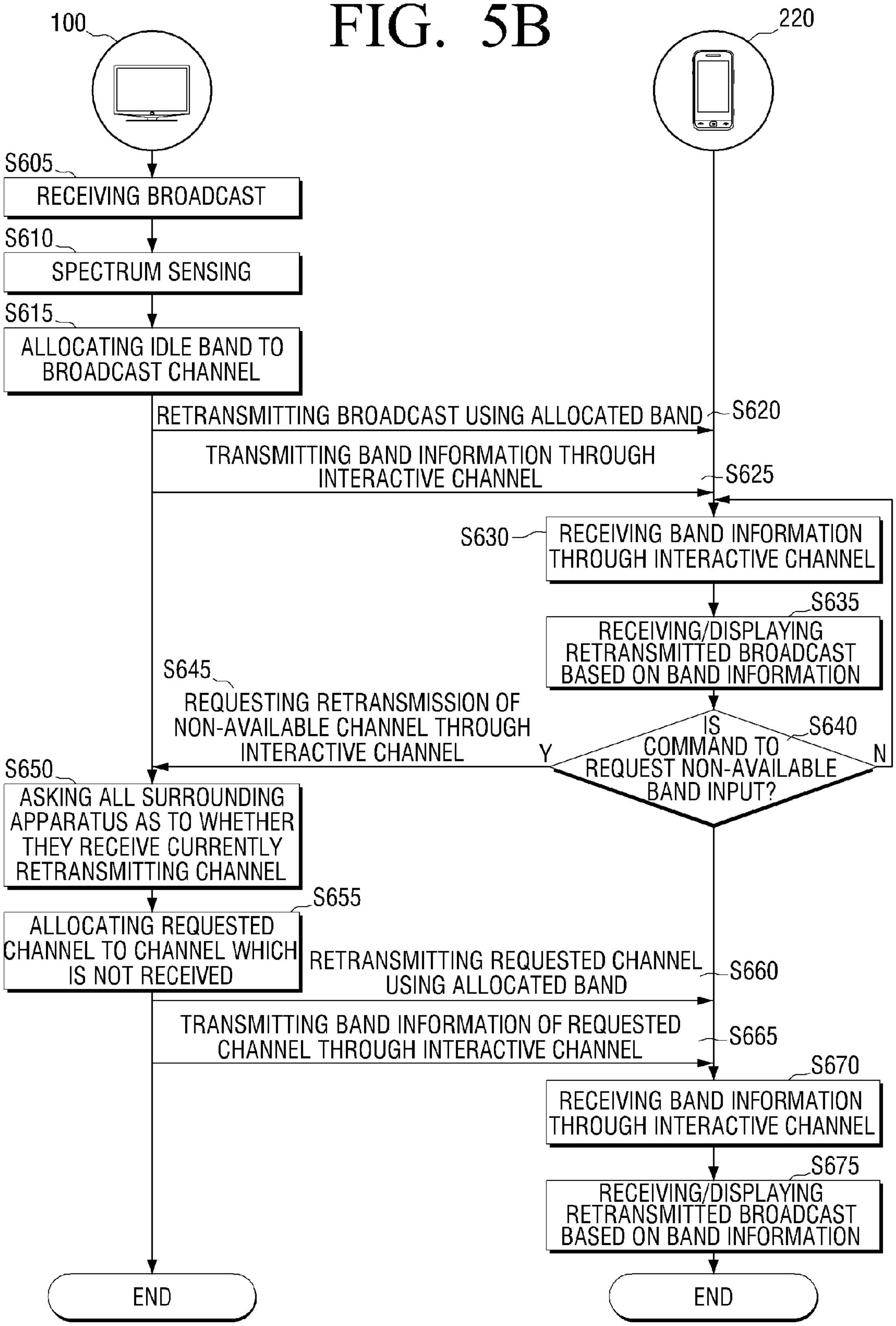
Figure 6:
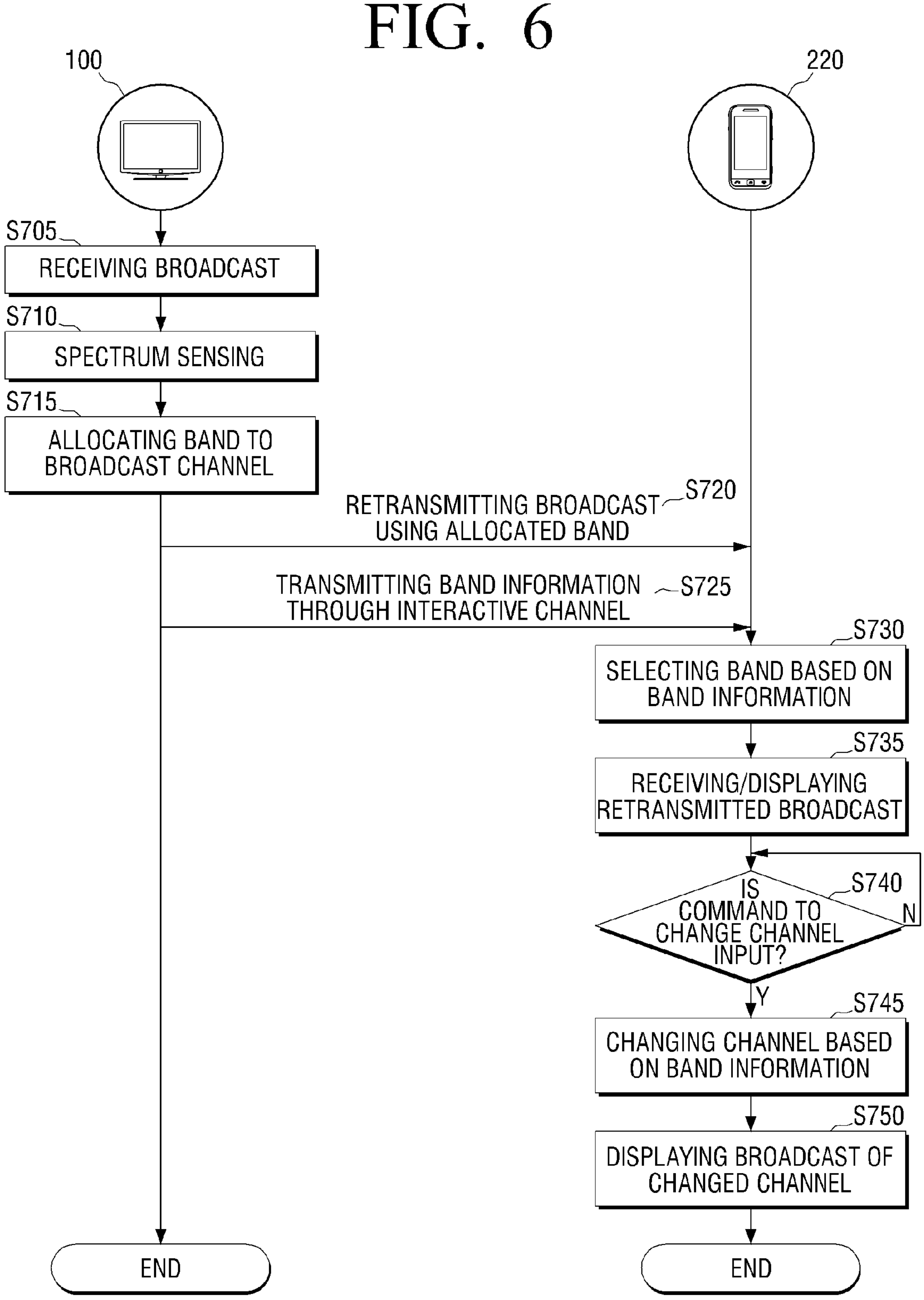
FIG. 6 is a flowchart illustrating a broadcast retransmitting method for changing a channel by a surrounding apparatus.

FIGS. 5A and 5B are flowcharts illustrating a broadcast retransmitting method if channel information is requested from a surrounding apparatus.

FIG. 5A is a view illustrating a broadcast retransmitting process if there is a request for a channel which is not currently retransmitted and an additional idle band cab be detected.

The host TV 100 receives a satellite broadcast signal, a terrestrial broadcast signal, or a cable broadcast signal from a broadcasting station or a satellite (S505), and performs spectrum sensing with respect to idle bands among unauthorized bands to retransmit the broadcast signal to the mobile phone 220 (S510).

If the host TV 100 detects idle bands from unauthorized bands through spectrum sensing, the host TV 100 allocates some or all of the idle bands to respective broadcast channels (S515), and retransmits the broadcast signal to the mobile phone 220 using the allocated bands (S520).

Also, the host TV 100 transmits information regarding the allocated bands to the mobile phone 220 through the interactive channel (S525). At this time, the host TV 100 may transmit diverse information, which is necessary for the mobile phone 220 to receive a broadcast which is transmitted using an idle band and to allow a user to watch the broadcast, to the mobile phone 220 through the interactive channel.

The mobile phone 220 receives the band information from the host TV 100 through the interactive channel (S530), and receives and display the retransmitted broadcast signal based on the band information (S535).

If a command to request a non-available channel is input from a user (S540), the mobile phone 220 transmits a request for retransmission of the non-available channel through the interactive channel (S545).

The host TV 100 allocates the requested non-available channel to an idle spectrum to retransmit the non-available channel to the mobile phone 220 (S550), and retransmits the non-available channel using the allocated band (S555). Also, the host TV 100 transmits band information of the requested channel to the mobile phone 220 through the interactive channel (S560).

The mobile phone 220 receives the band information from the host TV 100 through the interactive channel (S565), and receives and displays the retransmitted broadcast based on the band information in response to the request (S570).

As described above, since the band information is requested and transmitted through the interactive channel rather than the broadcast retransmit channel, a broadcast corresponding to the requested channel can be provided to the mobile phone 220.

FIG. 5B is a flowchart illustrating a process of changing retransmit channels if there is a request for a channel which is not currently retransmitted.

The host TV 100 receives a satellite broadcast signal, a terrestrial broadcast signal, or a cable broadcast signal from a broadcasting station or a satellite (S605), and performs spectrum sensing with respect to idle bands among unauthorized bands to retransmit the broadcast to the mobile phone 220 (S610).

If the host TV 100 detects idle bands from unauthorized bands through spectrum sensing, the host TV 100 allocates some or all of the idle bands to respective broadcast channels (S615), and retransmits the broadcast signal to the mobile phone 220 using the allocated bands (S620).

The host TV 100 transmits band information regarding the allocated bands to the mobile phone 220 through the interactive channel (S625). At this time, the host TV 100 may transmit diverse information, which is necessary for the mobile phone 220 to receive a broadcast signal transmitted using an idle band and to allow a user to watch the broadcast, to the mobile phone 220 through the interactive channel.

The mobile phone 220 receives the band information from the host TV 100 through the interactive channel (S630), and receives and displays the retransmitted broadcast based on the received band information (S635).

If a request for a non-available channel is input from a user (S640), the mobile phone 220 transmits a request for retransmission of the non-available channel through the interactive channel (S645).

The host TV 100 asks all surrounding apparatuses whether they receive a currently retransmitting channel or not in order to retransmit the requested non-available channel to the mobile phone 220 (S650). That is, the host TV 100 detects a channel which is not received by the surrounding apparatuses including the mobile phone 220 and allocates the requested channel to the detected channel (S655), and retransmits the non-available channel using the allocated band (S660). Also, the host TV 100 transmits band information regarding the requested channel to the mobile phone 220 through the interactive channel (S665).

The mobile phone 220 receives the band information from the host TV 100 through the interactive channel (S670), and receives and displays the retransmitted broadcast signal based on the band information in response to the request for the non-available channel (S675).

As described above, since the band information is requested and transmitted through the interactive channel rather than the broadcast retransmit channel, a broadcast corresponding to a requested channel can be provided to the mobile phone 220.

FIG. 6 is a flowchart illustrating a broadcast retransmitting method for changing a channel by a surrounding apparatus.

The host TV 100 receives a satellite broadcast signal, a terrestrial broadcast signal, or a cable broadcast signal from a broadcasting station or a satellite (S705), and performs spectrum sensing with respect to unauthorized bands to retransmit the broadcast signal to the mobile phone 220 (S710).

If the host TV 100 detects an available band from unauthorized bands through spectrum sensing, the host TV 100 allocates some or all of the available bands to respective channels (S715), and retransmits the broadcast signal to the mobile phone 220 using the allocated bands (S720).

At the same time of retransmitting the broadcast signal or before or after retransmitting the broadcast signal, the host TV 100 transmits band information of the allocated band, as a kind of broadcast information, to the mobile phone 220 through the interactive channel (S725).

The mobile phone 220 selects a band of a channel which is input and designated by a user, based on the band information received through the interactive channel without performing spectrum sensing (S730). For example, if a user inputs a channel "7" using the mobile phone 220, the mobile phone 220 selects a band to which the channel "7" is allocated based on the band information received through the interactive channel.

The mobile phone 220 receives the retransmitted broadcast signal using the selected band and displays the broadcast on a screen (S735).

As described above, the mobile phone 220 can select a band of a desired broadcast channel based on the band information received through the interactive channel, without performing extra spectrum sensing, that is, using only initial spectrum sensing.

The mobile phone 220 checks if a command to change a channel is input by a user (S740), and if so, changes the channel based on the already received band information (S745). For example, if the user changes the channel to a channel "9" using the mobile phone 220, the mobile phone 220 selects a band to which the channel "9" is allocated based on the band information already received through the interactive channel.

The mobile phone 220 displays a broadcast signal received through the changed channel on the screen (S750).

<Configurations of a Broadcast Retransmitting Apparatus and a Receiving Apparatus>

Hereinafter, a broadcast retransmitting apparatus and a receiving apparatus will be described in detail with reference to FIGS. 7 and 8.

Figure 7:
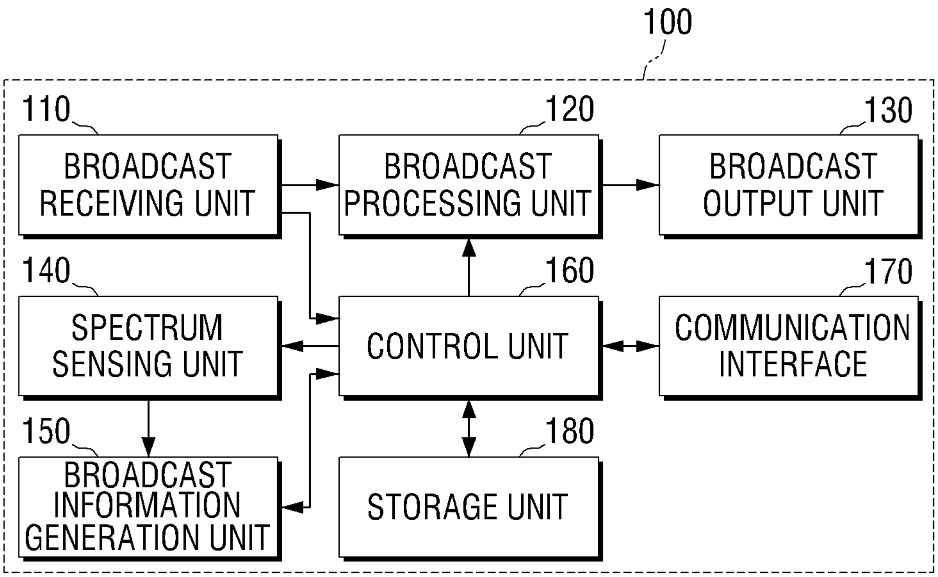
FIG. 7 is a block diagram illustrating a host TV according to an exemplary embodiment.

FIG. 7 is a block diagram illustrating the host TV 100 described above. The host TV 100 is merely an example of an apparatus for retransmitting a broadcast signal in a home broadcasting system and the exemplary embodiment can be applied even if any other device replaces the host TV 100.

The host TV 100 includes a broadcast receiving unit 110, a broadcast processing unit 120, a broadcast output unit 130, a spectrum sensing unit 140, a broadcast information generation unit 150, a control unit 160, a communication interface 170, and a storage unit 180.

The broadcast receiving unit 110 tunes to one of broadcast signals received in a wired or wireless manner, amplifies it, demodulates the amplified broadcast signal and extracts a transport stream.

The broadcast receiving unit 110 transmits the amplified broadcast signal to the control unit 160 or transmits the demodulated broadcast signal to the broadcast processing unit 120.

The broadcast receiving unit 110 transmits the amplified broadcast signal to the control unit 160 if the host TV 100 serves as a host apparatus. That is, if the host TV 100 serves as a host apparatus to retransmit a received broadcast signal to a surrounding apparatus, the broadcast receiving unit 110 transmits the amplified broadcast signal to the control unit 160 to transmit it to the surrounding apparatus.

On the other hand, the broadcast receiving unit 110 transmits the demodulated broadcast signal to the broadcast processing unit 120 if the host TV 100 serves as a general TV. That is, if the host TV 100 serves as a TV to provide a received broadcast to a user, the broadcast receiving unit 110 transmits the demodulated broadcast signal to the broadcast processing unit 120 to provide it to the user.

The broadcast processing unit 120 performs signal-processing with respect to the broadcast signal output from the broadcast receiving unit 110. The broadcast processing unit 120 separates a video signal, an audio signal, and additional information from the broadcast signal output from the broadcast receiving unit 110, and outputs them.

The broadcast processing unit 120 decodes the audio signal separated from the broadcast signal, thereby generating a decompressed audio signal, and converts the decoded audio signal into an audio signal of a format that can be output through a speaker.

Furthermore, the broadcast processing unit 120 decodes the video signal separated from the broadcast signal, thereby generating a decompressed video signal, and converts the decoded video signal into a video signal of a format that can be output through a display. To achieve this, color signal processing and scaling are performed with respect to the decoded video signal.

The broadcast processing unit 120 transmits the audio signal and the video signal in a format that can be output to the broadcast output unit 130.

The broadcast output unit 130 outputs the audio signal output from the broadcast processing unit 120 through a speaker or outputs it to an external display (for example, an external TV) connected through an external output terminal.

The broadcast output unit 130 outputs the video signal output from the broadcast processing unit 120 through a display or outputs it to an external display (for example, an external TV) connected through an external output terminal.

The spectrum sensing unit 140 detects a band or a channel within a predetermined frequency range in sequence and determines whether the band or channel included in the predetermined frequency range is available or not. In particular, the spectrum sensing unit 140 detects an available band from idle bands of unauthorized bands. The spectrum sensing unit 140 transmits information regarding the detected available band to the broadcast information generation unit 150.

The broadcast information generation unit 150 allocates the available band to respective channels based on the information regarding the available band detected by the spectrum sensing unit 140.

The broadcast information generation unit 150 generates broadcast information based on the information regarding the available band detected by the spectrum sensing unit 140 and band information regarding the band allocated to respective channels.

The broadcast information may include information regarding an available band occupied by a retransmitted broadcast, information regarding a current status of a retransmit frequency band allocated to respective channels, that is, band information, information regarding reception intensity when a surrounding apparatus receives a broadcast, information data regarding a rank of each channel, and diverse broadcast information such as electronic program guide (EPG).

The broadcast information generation unit 150 transmits the broadcast information to the control unit 160.

The communication interface 170 operates to communicate with surrounding apparatuses. In particular, the communication interface 170 retransmits a broadcast to a surrounding apparatus through the broadcast retransmit channel, and exchanges broadcast information with a surrounding apparatus through the interactive channel.

The control unit 160 controls the overall operation of the host TV 100. In particular, the control unit 160 controls the broadcast processing unit 120 to output the broadcast received at the broadcast receiving unit 110 to the broadcast output unit 130, such that the host TV 100 performs an original operation of a TV.

Furthermore, the control unit 160 controls the spectrum sensing unit 140, the broadcast information generation unit 150, and the communication interface 170 to detect an available band from idle bands, generate broadcast information based on a result of detection, and retransmit a broadcast signal to a surrounding apparatus using the available band and exchange broadcast information through the interactive channel, such that the host TV 100 performs an operation of a host apparatus.

The storage unit 170 stores diverse program information for operating the host TV 100 and broadcast information, and may be realized as a flash memory or a hard disk drive (HDD).

Figure 8:
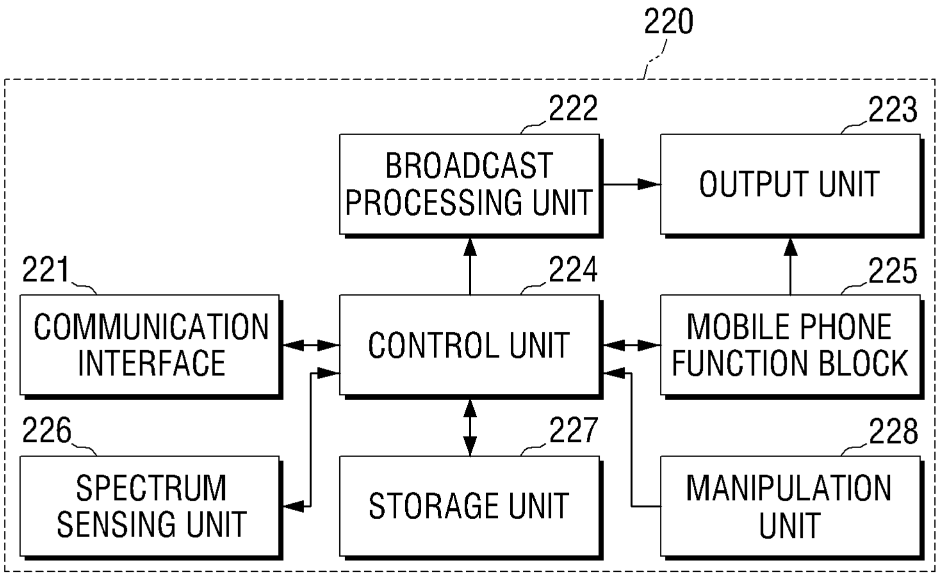
FIG. 8 is a block diagram illustrating a mobile phone according to an exemplary embodiment.

FIG. 8 is a block diagram illustrating the mobile phone 220 described above. For convenience of explanation, FIG. 8 illustrates the mobile phone 220 as a representative of the surrounding apparatus and the configurations of the other surrounding apparatuses such as the TV 210 and the PMP 230 can be inferred from that of the mobile phone 220. The other surrounding apparatuses are also merely an example of apparatuses to re-receive a broadcast in a home broadcasting system and the exemplary embodiment can be applied even if any other apparatus replaces the surrounding apparatuses.

The mobile phone 220 includes a communication interface 221, a broadcast processing unit 222, an output unit 223, a control unit 224, a mobile phone function block 225, a spectrum sensing unit 226, a storage unit 227, and a manipulation unit 228.

The communication interface 221 operates as a means for communicating with the host TV 100. In particular, the communication interface 221 is operated to re-receive a broadcast signal from the host TV 100 through the broadcast retransmit channel and exchange diverse information such as broadcast information with the host TV 100 through the interactive channel.

The broadcast processing unit 222 performs signal-processing with respect to a broadcast signal received from the host TV 100 through the communication interface 221. More specifically, the broadcast processing unit 222 separates an audio signal and a video signal from the broadcast signal, decodes the audio signal to generate a decompressed audio signal, and converts the decoded audio signal into a format that is capable of being output. Also, the broadcast processing unit 222 decodes the video signal to generate a decompressed video signal, and converts the decoded video signal into a format that is capable of being output.

The broadcast processing unit 222 transmits the audio signal and the video signal that are capable of being output to the output unit 223.

The output unit 223 outputs the audio signal and the video signal output from the broadcast processing unit 222. The output unit 223 receives a signal related to a mobile phone function from the mobile phone function block 225, which will be described below, and outputs the signal.

The spectrum sensing unit 226 detects bands or channels within a predetermined frequency range in sequence to find a band through which a broadcast is retransmitted. Also, the spectrum sensing unit 226 selectively receives, among the detected bands, a broadcast received through a channel according to a user manipulation input through the manipulation unit 228, and transmits the broadcast to the control unit 224.

The mobile phone function block 225 processes the functions for performing an original operation of the mobile phone 220.

The control unit 224 controls the overall operation of the mobile phone 220. In particular, the control unit 224 controls the broadcast processing unit 222 to output the broadcast signal retransmitted through the communication interface to the output unit 223, so that a user can watch the broadcast.

Furthermore, the control unit 224 controls the spectrum sensing unit 226 to detect bands or channels within a predetermined frequency range in sequence and find a band for retransmitting a broadcast based on a result of detection. The control unit 224 selects a broadcast received through a channel according to a manipulation of the manipulation unit 228 and outputs it to the output unit 223.

The storage unit 227 stores diverse program information for operating the mobile phone 220 and broadcast information received from the host TV 100 through the interactive channel, and may be realized as a flash memory or a HDD.

The manipulation unit 228 transmits a user command, for example a command to manipulate a channel, which is received from a button on the mobile phone 220, to the control unit 224, and the control unit 224 controls the overall operation of the mobile phone 220 according to the user command received from the manipulation unit 228.

Although broadcast retransmission and broadcast information exchange between the host TV 100 and the mobile phone 220 are described above, broadcast retransmission and broadcast information exchange between the host TV 100 and a plurality of surrounding apparatuses belong to the technical scope of the exemplary embodiments. In particular, the interactive channel used to exchange the broadcast information may adopt Zigbee or Bluetooth and, since the Zigbee or Bluetooth enables 1:1 and 1:n access, it is possible for the host TV 100 and the plurality of surrounding apparatuses to exchange the broadcast information with each other.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A broadcast retransmitting method to retransmit a broadcast received by a host apparatus to a peripheral apparatus, comprising:

receiving a broadcast signal by the host apparatus;

detecting a first available frequency band by performing spectrum sensing on unauthorized idle frequency bands which are idle frequency bands allocated to a primary user different from a secondary user;

retransmitting the received broadcast signal to the peripheral apparatus using the detected first available frequency band; and transmitting information regarding the broadcast signal, the information being generated by the detecting the first available frequency band, to the peripheral apparatus through a channel of a second frequency band which is different from the first available frequency band, wherein the information regarding the broadcast signal comprises information regarding a band which is reallocated to each broadcast channel if the first available frequency band is changed.

2. The broadcast retransmitting method as claimed in claim 1, wherein the detecting operation is performed at predetermined time intervals or time intervals defined by a user.

3. The broadcast retransmitting method as claimed in claim 1, wherein the peripheral apparatus selectively outputs information corresponding to a first broadcast signal received on a first channel of the first available frequency band among a plurality of broadcast signals received using the first available frequency band, and the information regarding the broadcast signal further comprises information regarding a plurality of retransmitting frequency bands of each channel included in the first available frequency band, each channel corresponding to a different broadcast signal.

4. The broadcast retransmitting method as claimed in claim 3, wherein, if a command to change a channel is input, the peripheral apparatus changes the first channel based on the information regarding the broadcast signal without performing spectrum sensing.

5. The broadcast retransmitting method as claimed in claim 1, wherein the second frequency band is an industrial, scientific and medical (ISM) band.

6. The broadcast retransmitting method as claimed in claim 5, wherein the ISM band is a frequency band configured to allow ZigBee communication or Bluetooth communication.

7. The broadcast retransmitting method as claimed in claim 1, wherein the transmitting operation transmits the information regarding the broadcast signal to the peripheral apparatus, if a request for the information regarding the broadcast signal is received from the peripheral apparatus through the channel of the second frequency band.

8. The broadcast retransmitting method as claimed in claim 1, further comprising exchanging data, other than the information regarding the broadcast signal, through the channel of the second frequency band.

9. The broadcast retransmitting method as claimed in claim 8, wherein the data comprises data regarding reception intensity when the peripheral apparatus receives the broadcast signal, and data regarding a rank of the channel.

10. The broadcast retransmitting method as claimed in claim 2, further comprising:

when the received broadcast signal is no longer retransmitted through the first available frequency, detecting a second available frequency band;

retransmitting the received broadcast signal to the peripheral apparatus using the detected second available frequency band; and transmitting information regarding the broadcast signal to the peripheral apparatus through the channel of the second frequency band which is different from the second available frequency band.

11. The broadcast retransmitting method as claimed in claim 1, further comprising:

if a request for a channel which is not currently retransmitted is input, receiving a request for retransmission of the channel which is not currently retransmitted through the channel of the second frequency band;

allocating the requested channel to an unauthorized idle frequency band; and retransmitting the requested channel using the allocated frequency band.

12. The broadcast retransmitting method as claimed in claim 11, further comprising:

when it is determined that the unauthorized idle frequency band does not exist, detecting a channel which is not received by a third apparatus;

allocating the requested channel to the detected channel; and retransmitting the requested channel using a frequency band of the detected channel.

13. A broadcast retransmitting apparatus to retransmit a broadcast to a peripheral apparatus, comprising:

a spectrum sensing unit which detects an available frequency band from unauthorized idle frequency bands to retransmit a received broadcast signal, the unauthorized idle frequency bands being idle frequency bands allocated to a primary user different from a secondary user; and a control unit which controls the received broadcast signal to be retransmitted to the peripheral apparatus using the detected available frequency band, and information regarding the broadcast signal, the information being generated by the detecting the first available frequency band, to be transmitted to the peripheral apparatus through a channel of a second frequency band which is different from the available frequency band, wherein the information regarding the broadcast signal comprises information regarding a band which is reallocated to each broadcast channel if the first available frequency band is changed.

14. The broadcast retransmitting apparatus as claimed in claim 13, wherein the spectrum sensing unit performs spectrum sensing at predetermined time intervals or time intervals defined by a user.

15. The broadcast retransmitting apparatus as claimed in claim 13, further comprising a broadcast information generation unit which generates the information regarding the broadcast signal, and, when a plurality of broadcast signals are received using the available frequency band, the information regarding the broadcast signal further comprises a plurality of retransmitting frequency bands of each channel included in the available frequency band, each channel corresponding to a different broadcast signal.

16. The broadcast retransmitting apparatus as claimed in claim 13, further comprising a communication interface which retransmits the broadcast signal and exchanges the information regarding the broadcast signal, wherein the control unit controls the information regarding the broadcast signal to be transmitted to the peripheral apparatus through the second frequency band, if a request for the information regarding the broadcast signal is received from the peripheral apparatus through the communication interface.

17. The broadcast retransmitting apparatus as claimed in claim 15, wherein, if a command to change a channel is input, the channel of the first available frequency band through which the received broadcast signal is retransmitted is changed based on the information regarding the broadcast signal without performing spectrum sensing.

18. The broadcast retransmitting apparatus as claimed in claim 13, wherein, if the spectrum sensing unit does not detect any available frequency band and a request for a channel which is not currently retransmitted is input through the channel of the second frequency band, the controller detects a channel which is not received by a third apparatus, allocates the requested channel to the detected channel, and retransmits the requested channel using a frequency band of the detected channel.

19. A broadcast retransmitting system, comprising:

a host device which receives a broadcast signal, retransmits the broadcast signal using an available frequency band detected by performing spectrum sensing on unauthorized idle frequency bands which are idle frequency bands allocated to a primary user different from a secondary user, and transmits information regarding the broadcast signal, the information being generated by the detecting the first available frequency band, through a channel of a second frequency band which is different from the available frequency band; and a peripheral device which selectively receives one or more broadcasts signals transmitted by the host device using the available frequency band, based on the information regarding the broadcast signal which is received through the channel of the second frequency band, wherein the information regarding the broadcast signal comprises information regarding a band which is reallocated to each broadcast channel if the first available frequency band is changed.

20. The broadcast retransmitting system as claimed in claim 19, wherein the host device is configured to receive a broadcast signal from a broadcasting station or a satellite, and the peripheral device is not configured to receive a broadcast signal from the broadcasting station or the satellite.

21. The broadcast retransmitting system as claimed in claim 19, wherein the peripheral device selectively outputs information corresponding to a first broadcast signal received on a first channel of the available frequency band among a plurality of broadcast signals received using the available frequency band, and the information regarding the broadcast signal further comprises information regarding a plurality of retransmitting frequency bands of each channel included in the first available frequency band, each channel corresponding to a different broadcast signal.

22. The broadcast retransmitting system as claimed in claim 21, wherein, if a command to change a channel is input, the peripheral device changes the first channel based on the information regarding the broadcast signal without performing spectrum sensing.

23. The broadcast retransmitting system as claimed in claim 19, wherein, if the host device does not detect any available frequency band and a request for a channel which is not currently retransmitted is input through the channel of the second frequency band, the host device detects a channel which is not received by a third apparatus, allocates the requested channel to the detected channel, and retransmits the requested channel using a frequency band of the detected channel.

* * * * *